US012633098B2

(12) United States Patent
Cowan et al.

(10) Patent No.: US 12,633,098 B2
(45) Date of Patent: May 19, 2026

(54) RESOURCE EFFICIENT TRAINING OF MACHINE LEARNING MODELS THAT PREDICT STOCHASTIC SPREAD

(71) Applicant: X Development LLC, Mountain View, CA (US)

(72) Inventors: Avery Noam Cowan, Atherton, CA (US); Nikhil Suresh, Foster City, CA (US); Akshina Gupta, Warren, NJ (US); David Andre, San Francisco, CA (US); Eliot Julien Cowan, Atherton, CA (US); Gearoid Murphy, Mountain View, CA (US)

(73) Assignee: Development LLC, Mountain View, CA (US)

( * ) Notice: Subject to any disclaimer, the term of this patent is extended or adjusted under 35 U.S.C. 154(b) by 301 days.

(21) Appl. No.: 18/493,018

(22) Filed: Oct. 24, 2023

(65) Prior Publication Data

US 2024/0135691 A1 Apr. 25, 2024
US 2024/0233346 A9 Jul. 11, 2024

Related U.S. Application Data

(60) Provisional application No. 63/380,672, filed on Oct. 24, 2022.

(51) Int. Cl.
*G06V 10/776* (2022.01)
*G06V 10/74* (2022.01)
*G06V 10/82* (2022.01)

(52) U.S. Cl.
CPC .......... *G06V 10/776* (2022.01); *G06V 10/761* (2022.01)

(58) Field of Classification Search
USPC ................................ 382/155–156, 159, 190
See application file for complete search history.

(56) References Cited

U.S. PATENT DOCUMENTS

| | | | |
|---|---|---|---|
| 11,144,835 B2 | 10/2021 | Anagnostou et al. | |
| 11,660,480 B2 | 5/2023 | Tohidi et al. | |
| 11,880,767 B2 * | 1/2024 | Price ...................... | G06N 3/047 |
| 12,005,281 B2 * | 6/2024 | Tohidi .................... | G06N 20/10 |

(Continued)

OTHER PUBLICATIONS

Hu et al., Weather Analogs with a Machine Learning Similarity Metric for Renewable Resources Forecasting, arXiv:2103,04530v2 [ess.SP], Mar. 9, 2021, pp. 1-32. (Year: 2021).*

*Primary Examiner* — Ishrat I Sherali
(74) *Attorney, Agent, or Firm* — Fish & Richardson P.C.

(57) ABSTRACT

Methods, systems, and apparatus for obtaining input features representative of a region of space, processing an input comprising the input features through the ML model to generate a prediction describing predicted features of the region of space, obtaining result features describing the region of space, determining a value of at least one evaluation metric that relates the predicted features and the result features, that at least one evaluation metric including one of a distance score, a pyramiding density error, and min-max intersection over union (IOU) score, and training the ML model responsive to the at least one evaluation metric. Other implementations of this aspect include corresponding systems, apparatus, and computer programs, configured to perform the actions of the methods, encoded on computer storage devices.

18 Claims, 4 Drawing Sheets

*Actual Delta*

130

(56)                   References Cited

U.S. PATENT DOCUMENTS

| | | | |
|---|---|---|---|
| 2006/0209184 A1* | 9/2006 | Chen .................... | G08B 29/186 |
| | | | 340/600 |
| 2018/0336460 A1* | 11/2018 | Tschemezki ......... | G06N 3/0464 |
| 2020/0155882 A1* | 5/2020 | Tohidi .................... | G06Q 10/04 |
| 2021/0076966 A1 | 3/2021 | Grantcharov et al. | |
| 2023/0177407 A1* | 6/2023 | Gupta ..................... | G06N 3/08 |
| | | | 706/12 |
| 2023/0177408 A1* | 6/2023 | Gupta ................... | G06N 3/045 |
| | | | 706/12 |
| 2024/0221310 A1* | 7/2024 | Gupta .................... | G06T 17/05 |

* cited by examiner

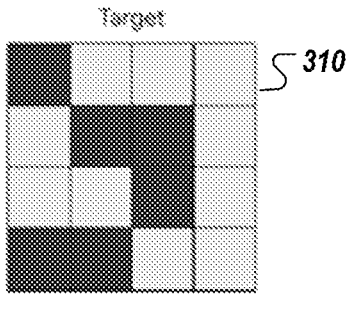
*FIG. 3A*
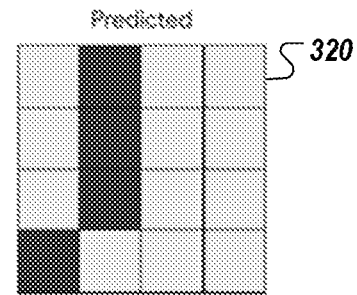
*FIG. 3B*
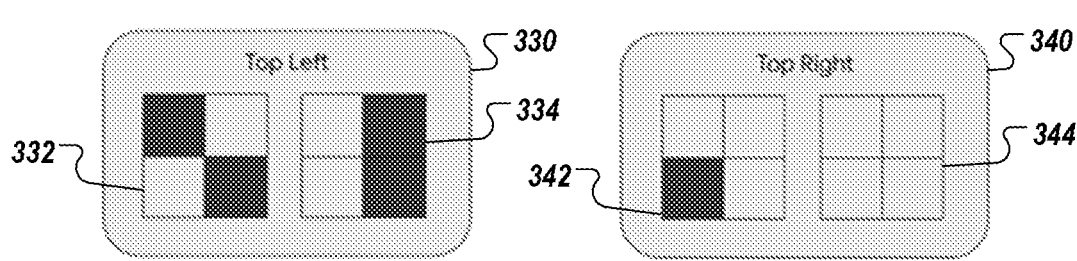
*FIG. 3C*          *FIG. 3D*
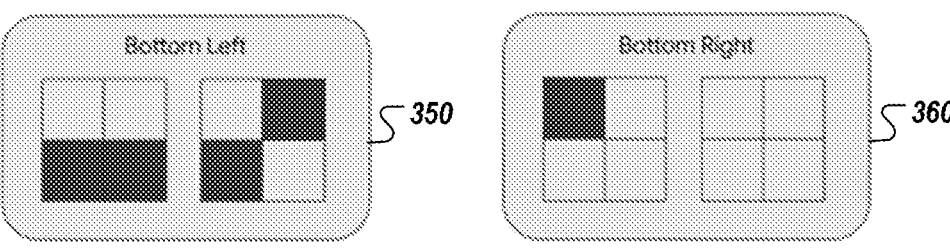
*FIG. 3E*          *FIG. 3F*

RESOURCE EFFICIENT TRAINING OF MACHINE LEARNING MODELS THAT PREDICT STOCHASTIC SPREAD

CROSS-REFERENCE TO RELATED APPLICATION

This application claims the benefit of U.S. Provisional Application No. 63/380,672 filed on Oct. 24, 2022, which is incorporated herein by reference.

TECHNICAL FIELD

This specification relates to machine learning (ML) models, and more specifically, to evaluating accuracy of predictions provided by ML models that predict stochastic spread for resource-efficient training of the ML models.

BACKGROUND

Spread events can occur in numerous contexts and imply spatial spread. Some spread events include so-called stochastic spread, in that there can be seeming randomness and uncertainty in direction of spread. Example spread events can include, but are not limited to, natural disaster spread (e.g., paths of wildfires, hurricanes, tornados, floods), population spread, disease spread, and malware spread, among many others. Some spread events can have adverse effects such as physical and financial losses. Consequently, significant time and effort is expended not only predicting occurrences of spread events, but characteristics of spread such as duration, severity, spread path/extent, and the like.

Technologies, such as machine learning (ML), have been leveraged to generate predictions around spread events in an effort to avoid and/or mitigate adverse effects. However, to be effective, ML models need to generate reliable, accurate, and actionable predictions. As such, ML models are evaluated prior to deployment for production use (e.g., inference time). Evaluation of ML models requires consumption of technical resources, such as processing power and memory. Traditional evaluation techniques, however, can be inefficient in terms of technical resources consumed in evaluating ML models.

SUMMARY

This specification describes systems, methods, devices, and other techniques relating to evaluating machine learning (ML) models that predict stochastic spread of an event and providing resource-efficient training of the ML models.

In general, innovative aspects of the subject matter described in this specification can include actions of obtaining input features representative of a region of space, processing an input including the input features through the ML model to generate a prediction describing predicted features of the region of space, obtaining result features describing the region of space, determining a value of at least one evaluation metric that relates the predicted features and the result features, that at least one evaluation metric including one of a distance score, a pyramiding density error, and min-max intersection over union (IOU) score, and training the ML model responsive to the at least one evaluation metric. Other implementations of this aspect include corresponding systems, apparatus, and computer programs, configured to perform the actions of the methods, encoded on computer storage devices.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, obtaining the input features representative of the region of space includes: obtaining image data of the region of space; and obtaining a set of properties of the region of space, wherein the set of properties include a set of data layers, each layer of the set of data layers includes (i) an array of pixels representing a portion of the region of space and (ii) having data that is representative of the portion of the region.

In some implementations, processing the input including the input features through the ML model to generate the prediction describing the predicted features of the region of space includes: for each layer of the set of data layers: for each pixel in the array of pixels of the layer: providing the pixel as input to the ML model to generate the prediction describing the predicted features of the region of space, wherein the prediction represents a likelihood that a spread occurs to the pixel in a subsequent training iteration.

In some implementations, the likelihood that the spread occurs to the pixel includes the likelihood that a natural disaster spread, a population spread, a disease spread, or a malware spread occurs to the pixel in the subsequent training iteration.

In some implementations, obtaining the results features describing the region of space includes obtaining observed features describing the region of space.

In some implementations, determining the value of the at least one evaluation metric that relates the predicted features and the result features includes: determining a first value of the distance score that relates the predicted features and the result features; determining a second value of the pyramiding density error that relates the predicted features and the result features; determining a third value of the min-max IOU score at relates the predicted features and the result features; and comparing the first value, the second value, and the third value to a first threshold, a second threshold, and a third threshold, respectively.

In some implementations, the method further includes: determining the predicted features are accurate in response to determining the first value satisfies the first threshold; or determining the predicted features are inaccurate in response to determining the second value satisfies the second threshold; or determining the predicted features are accurate in response to: determining the first value does not satisfy the first threshold; determining the second value does satisfy the second threshold; and determining the third value does satisfy the third threshold.

In some implementations, wherein determining the value of the pyramiding density error that relates the predicted features and the result features includes: computing a density difference between the predicted features and the result features by: counting a first number of pixels in the predicted features that show spread; counting a second number of pixels in the result features that show spread; determining a first density of the first number of pixels; determining a second density of the second number of pixels; and determining the density difference by subtracting the first density from the second density; dividing each of the predicted features and the result features into one or more sub-quadrants; and recomputing the density difference if a size of the one or more sub-quadrants satisfies a threshold; or calculating the value of the pyramiding density error as the density difference between the predicted features and the result features.

In some implementations, determining the value of the min-max IOU score that relates the predicted features and the result features includes: for each pixel in the predicted features: comparing a value of the pixel of predicted features to a value of a pixel of the result features, wherein the comparison is performed between two pixels at the same location; in response to the comparison: adding the value of the pixel to a first array whose value is less; and adding the value of the pixel to a second array whose value is greater; and generating a third array by (i) summing the values of the first array and the second array and (ii) dividing the summed values by the values of the second array, wherein the min-max IOU score for each pixel is stored by the generated third array.

In some implementations, training the ML model is performed over multiple epochs.

In some implementations, the method further includes: comparing the determined value of the at least one evaluation metric a threshold value; determining the value of the at least one evaluation metric satisfies the threshold value; and in response, training the ML model responsive to the at least one evaluation metric that satisfies the threshold value.

In some implementations, determining the value of the distance score that relates the predicted features and the result features includes: determining a pixel of the predicted features indicates a spread; setting new features to result features; repeatedly loop: segmenting each of the pixels in the new features to a first half and a second half, the first half containing a location of the determined pixel; identifying one or more pixels in the first half whose value matches to a value of the determined pixel; in response to identifying the one or more pixels in the first half whose value matches to the value of the determined pixel, setting the first half to the new features; and restarting the loop; or in response to not identifying the one or more pixels in the first half whose value matches to the value of the determined pixel or a number of pixels in the first half equates to one: setting the second half to the new features; and restarting the loop; or in response to determining a number of pixels in the first half equates to one: computing the value of the distance score as a distance between a location of the pixel of the predicted features to a location of a remaining pixel in the first half; and breaking the loop.

Particular implementations of the subject matter described in this specification can be executed so as to realize one or more of the following advantages. For example, implementations of the present disclosure enable a fire spread model to be used in an optimization process to determine the best countermeasures or fire mitigation for a fixed budget as well as faster real-time estimation.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A-3F illustrate determination of a pyramiding density error metric.

Like reference numbers and designations in the various drawings indicate like elements.

DETAILED DESCRIPTION

Figures 1A, 1B, 1C:
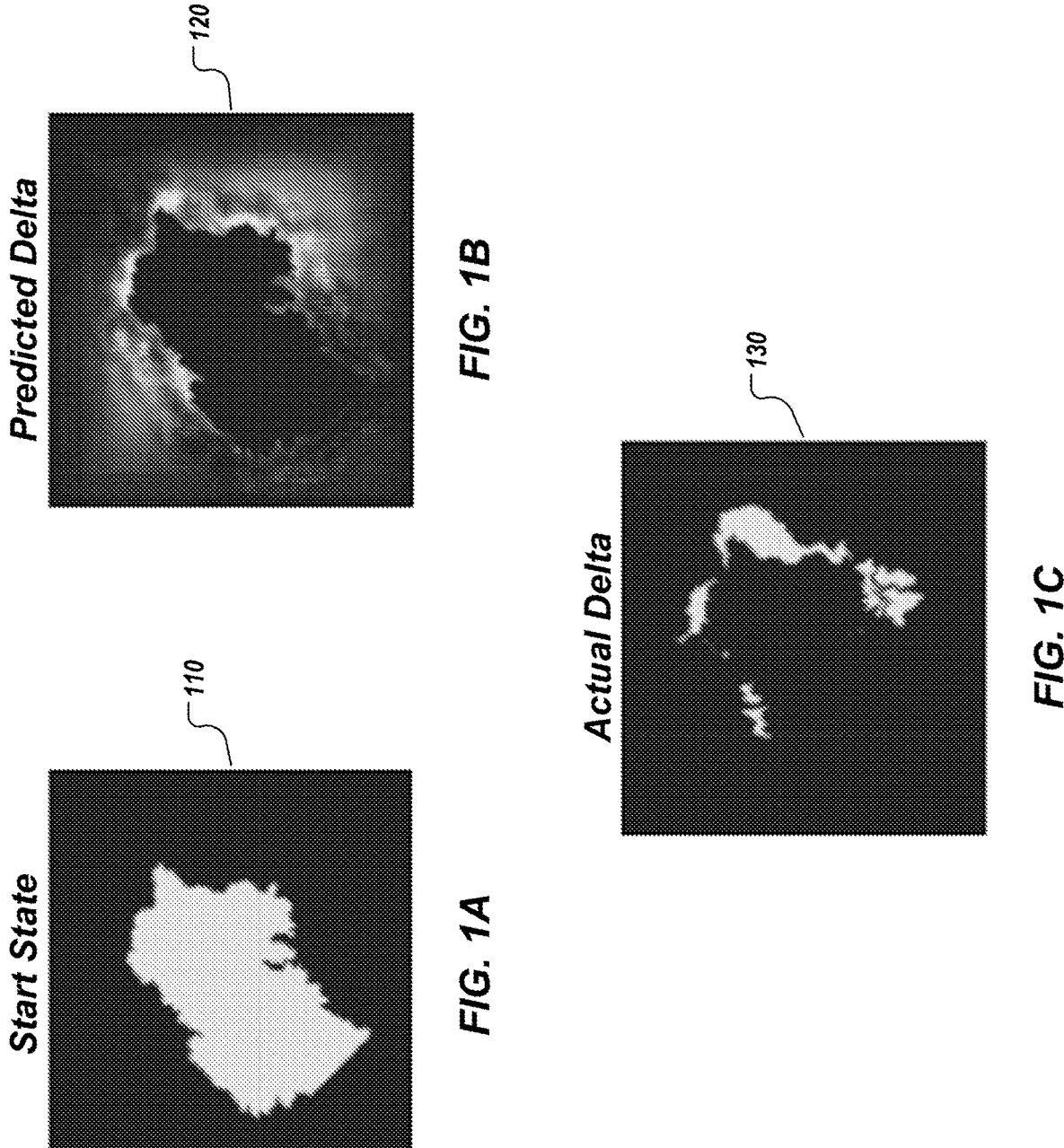
FIGS. 1A-1C illustrate fire spread.

This specification describes systems, methods, devices, and other techniques relating to evaluating machine learning (ML) models that predict stochastic spread of an event. More particularly, implementations of the present disclosure are directed to providing a set of metrics that can be used to evaluate ML models in a resource-efficient manner during training of the ML models.

Implementations of the present disclosure are described in further detail herein with reference to an example spread event, namely natural disasters, which is characterized by stochastic spread. In general, stochastic spread can be described as having uncertainty and/or randomness in rate and/or direction of spread, such that the spread of the event is non-deterministic. Implementations are described in further detail with reference to a non-limiting example natural disaster, namely, wildfire. It is contemplated, however, that implementations of the present disclosure can be realized for any appropriate spread event having stochastic spread that is modeled by a ML model. Examples of other such events are described in further detail below.

To provide context for the subject matter of the present disclosure, and as introduced above, ML has been leveraged to generate predictions around spread events, such as natural disasters. For example, ML models can be used to generate predictions representative of characteristics of a natural disaster, such as likelihood of occurrence, duration, severity, spread, among other characteristics, of the natural disaster.

In further detail, one or more ML models can be trained to predict characteristics of a natural disaster using training data that is representative of characteristics of occurrences of the natural disaster, for example. Example types of ML models can include Convolutional Neural Networks (CNNs), Residual Neural Networks (RNNs), Generative Adversarial Networks (GANs). The training data can include region data representative of respective regions (e.g., geographical areas), at which the natural disaster has occurred. In some examples, each ML model predicts a respective characteristic of the natural disaster. In the context of the present disclosure, an example ML model can include a spread model that predicts spread (e.g., rate, distance, direction) of the natural disaster in the region for respective timestamps.

In further detail, the region data can include an image of the region and a set of properties of the region. More generally, the region data can be described as a set of data layers (e.g., N data layers), each data layer providing a respective type of data representative of a property of the region. In some examples, the data layers can number in the tens of data layers to hundreds of data layers. In some examples, each data layer includes an array of pixels, each pixel representing a portion of the region and having data associated therewith that is representative of the portion of the region. A pixel can represent an area (e.g., square meters (m$^2$), square kilometers (km$^2$)) within the region. The area that a pixel represents in one data layer can be different from the area that a pixel represents in another data layer. For example, each pixel within a first data layer can represent X km$^2$ and each pixel within a second data layer can represent Y km$^2$, where X≠Y.

An example, data layer can include an image layer, in which each pixel is associated with image data, such as red, green, blue (RGB) values (e.g., each ranging from 0 to 255). Another example layer can include a vegetation layer, in which, for each pixel, a normalized vegetation difference index (NVDI) value (e.g., in range of [−1, 1], lower values indicating absence of vegetation). Other example layers can include, without limitation, a temperature layer, in which a temperature value is assigned to each pixel, a humidity layer, in which a humidity value is assigned to each pixel, a wind layer, in which wind-related values (e.g., speed, direction) are assigned to each pixel, a barometric pressure layer, in which a barometric pressure value is assigned to each pixel, a precipitation layer, in which a precipitation value is assigned to each pixel, and an elevation layer, in which an elevation value is assigned to each pixel.

In general, data values for pixels of data layers can be obtained from various data sources including data sources provided by, for example, governmental entities, non-governmental entities, public institutions, and private enterprises. For example, data can be obtained from databases maintained by the National Weather Service (NWS), the United States Fire Service (USFS), and the California Department of Forestry and Fire Protection (CAL FIRE) among many other entities. For example, weather-related data for a region can be obtained from a web-accessible database (e.g., through a hypertext transfer protocol (HTTP), calls to an application programming interface (API)). In another example, data stored in a relational database can be retrieved through queries to the database (e.g., structured query language (SQL) queries).

Because values across the data layers can change over time, the region data can be temporal. For example, temperature values for the region can be significantly different in summer as compared to winter.

Accordingly, the region data can include an array of pixels (e.g., [$p_{1,1}$, . . . , $p_{i,j}$]), in which each pixel is associated with a vector of N dimensions, N being the number of data layers. For example, $p_{i,j}=[I_{i,j}, V_{i,j}, W_{i,j}, \ldots ]$, where I is image data, V is vegetation data, and W is weather data.

As training data, the region data, which can be referred to as region training data in the context of training, can include one or more characteristic layers that provides known characteristic data for respective characteristics of a natural disaster. The known characteristic data represents actual values of the respective characteristics as a result of the natural disaster. For example, a wildfire can occur within a region and, as a result, characteristics of intensity, spread, duration, and the like can be determined for the wildfire. Accordingly, as training data, the region data can include, for example, $$p_{i,j} = [I_{i,j},\ V_{i,j},\ W_{i,j},\ \ldots,\ C^K_{A,i,j}, C^K_{B,i,j},\ \ldots],$$

where $$C^K_{A,i,j} \text{ and } C^K_{A,i,j}$$

are respective known (K) characteristics (i.e., historical characteristics) of a natural disaster in question.

A spread ML model is trained using the region training data. The training process can depend on a type of the ML model. In general, the ML model is iteratively trained, where, during an iteration, also referred to as epoch, one or more parameters of the ML model are adjusted, and an output (e.g., predicted characteristic value) is generated based on the training data. For each iteration, a loss value is determined based on a loss function. The loss value represents a degree of accuracy of the output of the ML model as compared to a known value (e.g., known characteristic). The loss value can be described as a representation of a degree of difference between the output of the ML model and an expected output of the ML model (the expected output being provided from training data). In some examples, if the loss value does not meet an expected value (e.g., is not equal to zero), parameters of the ML model are adjusted in another iteration (epoch) of training. In some examples, the iterative training continues for a pre-defined number of iterations (epochs). In some examples, the iterative training continues until the loss value meets the expected value or is within a threshold range of the expected value.

To generate predictions, region data representative of a region, for which predictions are to be generated, is provided as input to a (trained) ML model, which generates a predicted characteristic for each pixel within the region data. An example output of the ML model can include $$p_{i,j} = [C^P_{i,j}],$$

where C is a characteristic predicted (P) by the ML model. In the context of the present disclosure, the characteristic can be the probability of spread from one location to an adjacent location for a given timestamp, each location being represented as a pixel. In some examples, an image of the region can be displayed to visually depict the predicted characteristic across the region. For example, different values of the characteristic can be associated with respective visual cues (e.g., colors, shades of colors), and the predicted characteristic can be visually displayed as a heatmap over an image of the region.

FIGS. 1A-1C illustrate an example of fire spread. A fire spread ML model, such as a neural network configured to generate fire spread predictions, can accept an initial representation 110 of a fire (e.g., the representation 110 illustrated in FIG. 1A) and can be used to generate a predicted spread 120 over a given time interval (e.g., as illustrated in FIG. 1B). The ML model can be evaluated by comparing the predicted spread (i.e., the spread 120) to data 130 representing an actual spread of the fire (e.g., as illustrated in FIG. 1C). This comparison is achieved through evaluation metrics, as described herein. Each pixel in the predicted spread 120 can represent a likelihood that the fire spreads to the corresponding pixel in a next time interval. An accurate evaluation metric prioritizes the direction and scale of fire spread, while reflecting the fact that fire spread is stochastic. Because the spread is stochastic, fire pixel predictions will inherently contain inaccuracies, and therefore, general trends are predicted.

As introduced above, to be effective, ML models need to generate reliable, accurate, and actionable predictions. As such, ML models are evaluated prior to deployment for production use (e.g., inference time). Evaluation of ML models requires consumption of technical resources, such as processing power and memory that are consumed during training, testing, and validation of the ML model. Traditional evaluation techniques, however, can be inefficient in terms of technical resources consumed in evaluating ML models. For example, traditional evaluation techniques include com- plex evaluation metrics that result in relatively high con- sumption of technical resources during training, testing, and validation.

In further detail, metrics commonly used to evaluate ML models can include intersection over union (IOU), precision, recall, and F1 score. In general, IOU can be described as representing an extent of overlap between two things, such as bounding boxes in images. In general, precision and recall can be described as metrics that help evaluate the predictive performance of a classification model on a particular class of interest, referred to as the positive class. Precision can represent an extent of error caused by false positives and recall can represent the extent of error caused by false negatives. In general, the F1 score can be described as a weighted average of precision and recall. Each of these example metrics, can be used determine the accuracy of pixel-level predictions. However, traditional evaluation met- rics, such as the example introduced above, are absent consideration of characteristics associated with spatial spread of an event, such as scale and direction. Further, traditional metrics, such as those introduced above, are sub-optimal when evaluating event spread, because they perform best when applied to multi-channel images that contain many distinguishing features. Event spread maps, such as fire spread maps have few, if any distinguishing features.

Other traditional evaluation metrics are applicable to binary arrays, which require thresholding data to binary classifications. Thresholding can be described as variables with values equal to or above a threshold being assigned to a first value, and variables below the threshold being assigned a different value, each being referred to as thresh- olded values or thresholded data. However, ML models that output floating point numbers in a continuous range can be inaccurate when presented with thresholded data, because thresholding results in an inherent loss of information (e.g., the compression of infinite values to two values). As a result, finding an accurate threshold is difficult and even the best performing thresholds are inconsistent when presented with different data sets.

In view of the foregoing, implementations of the present disclosure provide a set of evaluation metrics for resource- efficient evaluation of ML models that predict stochastic spread. The set of evaluation metrics includes a distance score, a pyramiding density error, and a minimum-maxi- mum (min-max) IOU, each of which is described in further detail herein. As described herein, the set of evaluation metrics can be used to provide ML models that have improved and accurate spread predictions in a resource- efficient manner. For example, use of evaluation metrics in the set of evaluation metrics improves efficiency of training, testing, and validation by reducing resources (e.g., proces- sors, memory) that would otherwise be consumed using traditional evaluation metrics, such as those discussed above. Evaluation metrics in the set of evaluation metrics can be used either with thresholded data or with non- thresholded data, as described below. In the context of wildfires, a start state, a predicted delta (that is, predicted changes to the fire perimeter), and actual delta (that is, the actual, observed change to the fire perimeter) can be repre- sented as a two-dimensional (2D) array of values, where each value is between 0 and 1, inclusive.

In cases where thresholding is applied, the threshold value can depend on ML model outputs, and can be in the range of, for example, 0.075 to 1.0, although other values are possible. All values equal to or above the threshold value can be set to 1, which indicates fire spread to that pixel. In contrast, all values below the threshold can be set to 0, which indicates no fire spread to that pixel. When thresholding is not applied, the inputs are passed in as 2D arrays of values from a continuous range [0, 1].

In further detail, and with reference to the distance score, the distance score represents a minimum distance between matching pixels and can be applied to both thresholded and non-thresholded data. In using the distance score, each pixel in the predicted delta state is assigned a distance score based on the minimum spatial distance from the pixel to a pixel in the target (observed) delta state with a similar value.

The end output can be weighted by the positive difference of the densities of the predicted and target deltas. This density weighting can enable the distance score to create more accurate large fire predictions and to increase the effective output range. That is, for example, moving the range from [0.9, 1.0] to [0.3, 0.1]. The distance score accounts for directionality by weighting predictions far from observed value pixels (that is, poor predictions) harshly, and accounts for scale through the density weighting, as described herein.

Figure 2C:
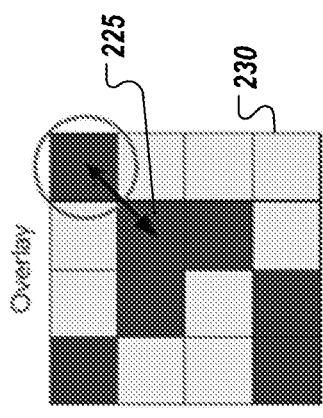
FIGS. 2A-2C illustrate determination of a distance score metric.
Figure 2B:
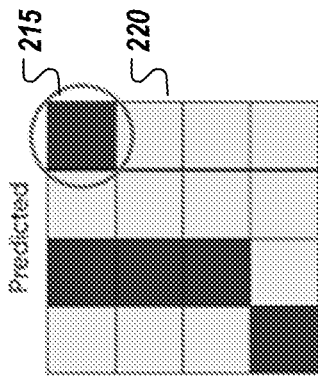
Figure 2A:
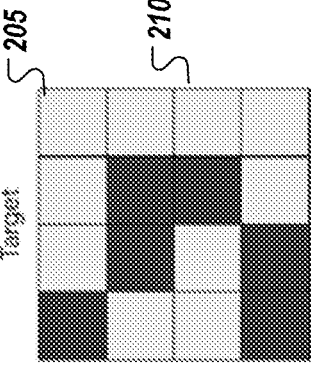

FIGS. 2A-2C represent an example calculation of a dis- tance score. In this example, a pixel 205 being analyzed is at coordinates (0, 3) (that is, the topmost row and rightmost column since coordinates in this example are zero-based). As illustrated in FIG. 2B, a pixel 215 has a thresholded value of 1 indicating predicted fire spread. Because the corre- sponding pixel 205 in a target delta 210 has a different value (that is, 0 instead of 1), the pixel 205 is not used. Instead, the closest pixel in the target delta with the exact same value of 1 is considered. Referring to FIG. 2C, a pixel 225 at (1, 2) (that is, the second row from the top and the third column from the left, again using zero-based coordinates), in an overlay 230, is the nearest pixel with the same value (that is, 1). Consequently, the minimum distance from the pixel 215 to a matching pixel 225 is $\sqrt{2}$, which can be computed using the Pythagorean Theorem.

However, straight-forward processes for determining this minimum distance are computationally intensive. First, for a given pixel in the predicted delta, a straight-forward method would determine which pixels in the target delta contain a matching value and computes the distance from the current pixel to each matching pixel. The process can then return the smallest of these distances. However, this process is very inefficient in terms of resource consumption, because it requires $O(N^4)$ operations. This is computationally imprac- tical, for example, for relatively large fires (e.g., fires rep- resented by hundreds of thousands of pixels).

In view of this, implementations of the present disclosure include a resource-efficient method of determining mini- mum distance, which is referred to as an augmented tree method (ATM). Using ATM, for a given pixel in the pre- dicted delta (e.g., each pixel in 220 of FIG. 2B), the target delta array is divided into two halves, one of which contains the location of a current pixel, which can be referred to as the closer half. The half with the current pixel is scanned for any pixels with matching values. If the closer half contains at least one pixel with a matching value, that half is itself divided into halves, and the process is repeated recursively until the level of a single pixel is reached. If the closer half does not contain any pixels with matching values, the other half, which can be referred to as the further half, is divided into two halves, and the process is repeated recursively until the pixel level is reached. ATM requires $O(N^2 \log (N))$ operations, which is substantially smaller than $O(N^4)$, and therefore consumes fewer resources in computation.

With the minimum distance computed, a distance function can be applied to this minimum distance, scaling it such that low minimum distances are assigned scores close to 1, while higher minimum distances are assigned scores closer to 0. The distance score of this example can be calculated as:

$$\frac{1}{1 + \sqrt{2}}$$

This reflects that pixels closer to a given pixel are more likely to influence whether the event will spread to the area represented by an adjacent pixel. This distance function can be applied to every pixel in the predicted delta and averaged across all calculations. As described above, a density weighting is also applied to this output. This output has a theoretical range from [0, 1], but more commonly can be in the range of [0.3, 1]. An example decision boundary, that is, the score above which a score is considered to be an accurate prediction, can be 0.9, although other values can be used.

When determining a distance score without thresholding—that is, values can be floating point numbers instead of being only 0 or 1—the distance score computation requires different matching criteria for identifying similar pixels in the target delta state. Since non-thresholded pixel values are continuous in the range [0, 1], pixels can no longer be matched accurately using an exact comparison. Rather, two pixels are considered to match if their positive difference is less than a configured threshold. For example, a threshold of 0.05 can be used. Other than adjusting the matching criteria, the method described above for determining a distance score can be used.

With reference to FIGS. 3A-3F, the pyramiding density error will be described. The pyramiding density error can be used to determine density and to include a directional component, therefore accounting for scale and direction of a spatially spreading event (e.g., fire). Similar to the distance score, pyramiding density error can be used with thresholded and non-thresholded data.

As illustrated in FIGS. 3A and 3B, a positive difference between a density of a target and a predicted fire delta can be calculated and weighed by, for example, 0.5. In this example, a target 310 has six pixels out of 16 shaded, so the density is 6/16. A predicted density 320 is 4 of 16, or 4/16. The density difference is therefore 2/16.

Next, both fire delta images 310, 320 are divided into four sub quadrants, 330, 340, 350, 360 in FIGS. 3C, 3D, 3E, 3F, respectively, and the same calculation can be performed on each pair of corresponding sub quadrants. For example, in FIG. 3C, the densities of regions 332, 334 are both ½, so the difference is 0. Continuing with this example, in FIG. 3D, the densities of regions 342, 344 are ¼ and 0, respectively, so the difference is ¼.

The weight assigned to the difference values for each sub-quadrant can be the sub-quadrant size divided by the parent size. For example, the weight can be ⅛ of the parent's weight, but the weight can be larger or smaller than that. The process can continue until the metric reaches the individual pixel level.

With this process, if a target delta showed a fire spreading towards the northwest (up and to the left), that sub-quadrant would contribute more to the pyramiding density error, if the predicted delta did not predict spread toward the northwest, increasing the output error. This result occurs since more pixels will transition from unburned to burned when a fire spreads to a new area.

The pyramiding density error can be calculated using the same process regardless of whether thresholding is applied, but the output can vary significantly. For example, if the predicted delta is full of pixels with value 0.2, while the target has only pixels with values 0.9, the density difference will be 0.7 without thresholding. However, if the threshold is 0.1 and thresholding is applied, both deltas become deltas of 1, and the density error at that level will be 0.

With reference to FIGS. 4A-4D, min-max IOU will be described. Min-max IOU builds upon the concept of IOU. In IOU, two arrays of pixels are compared, one representing a prediction and one representing a ground truth. The intersection—that is, the number of corresponding 1 values between the two inputs—is determined (that is, a value of 1 exists in corresponding pixels at the same location in each array), the union—that is, total number of pixels with a 1 value in either array—is determined, and the intersection value is divided by the union value. However, while IOU requires binary input, the pixel data of this specification can be continuous, so thresholding of the pixel values would be required to apply IOU.

Min-max IOU introduced herein makes necessary substitutions to the IOU process to enable it to be used for spread models. As a result, thresholding is not required and the min-max IOU can better account for the stochastic nature of fire spread. As noted above, because the input delta states have pixel values on the continuous range [0, 1], normal IOU cannot be applied without thresholding. For min-max IOU, the intersection is the element-wise minimum of the two deltas, while the union is the element-wise maximum of the two deltas, as described below.

Figures 4A, 4B, 4C, 4D:
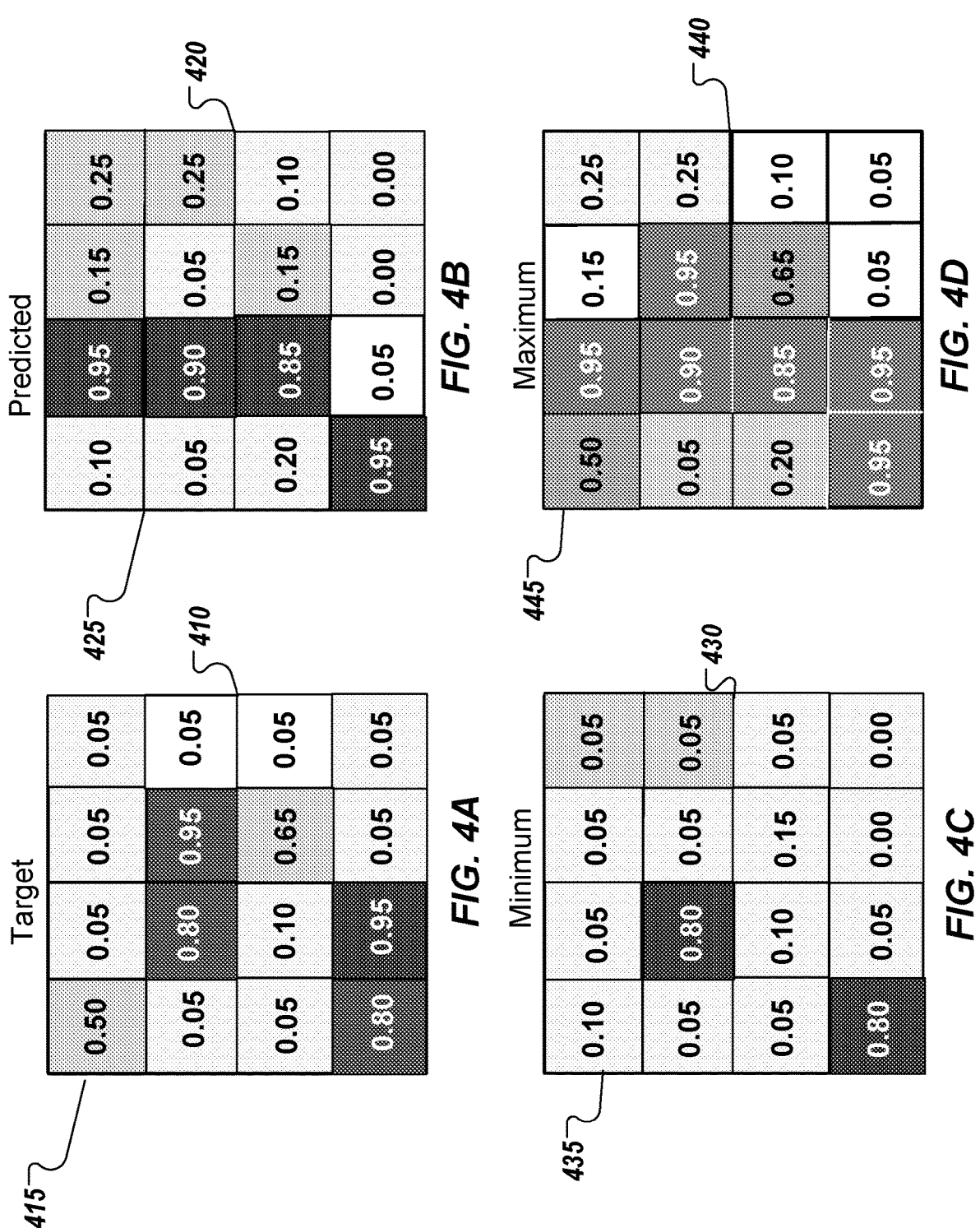
FIGS. 4A-4D illustrate determination of a min-max intersection over union (IOU) metric.

FIGS. 4A-4D illustrate an example of min-max IOU calculation. FIG. 4A illustrates ground truth values 410 and FIG. 4B illustrates predicted values 420. Comparing a value in pixel 415 of FIG. 4A to a value of a corresponding pixel 425 of FIG. 4B, the minimum value is 0.10, which is entered into pixel 435 of FIG. 4C. This illustrates an array 430 containing the minimum values. Similarly, comparing the value in pixel 415 to the value of the corresponding pixel 425, the maximum value is 0.50, which is entered into pixel 445 of FIG. 4D. This illustrates an array 440 containing the maximum values. To compute the min-max IOU, the values in the array 430 (minimum values) are summed and divided by the values in the array 440 (maximum values). In this example, the min-max IOU value is approximately 0.31.

Note that, unlike the distance score and the pyramiding density error presented in this specification, the min-max IOU is computed using a pixel-based approach, which can result in inaccuracies due to the stochastic nature of fire spread, especially with minor fire spread events. However, it is accurate when labeling high spread fires, because the stochastic nature of the spread is statistically less significant than the amount of fire spread.

The evaluation metrics presented in this specification, or any subset of the evaluation metrics, can be applied in combination as an ensemble of evaluation metrics for ML model evaluation. Because each evaluation metric emphasizes a different aspect of fire spread, aggregating the evaluation metrics can result in increased accuracy as compared to traditional evaluation metrics.

In some implementations, the evaluation metrics can be combined using the following approach. If the distance score is above a decision boundary (e.g., greater than 0.9), the prediction is considered accurate. If the pyramid density error is greater than 1, the prediction is determined to be inaccurate. If neither of the above, if min-max IOU is greater than a decision boundary (e.g., greater than 0.2), the prediction is considered accurate. If none of the prior conditions are met, the prediction is considered inaccurate. Other combinations of the evaluation metrics can also be used. In some instances, conventional evaluation metrics can also be used in combination with one or more of the evaluation metrics of this specification.

As discussed above, the set of evaluation metrics of the present disclosure can be used to evaluate a ML model during training, testing, and validation. For example, a ML model configured to predict spread can be trained using backpropagation using one or more of the evaluation metrics described herein. In some examples, after an epoch of training, predictions of the ML model can be evaluated using one or more of the evaluation metrics presented herein. For example, during training, predictions of the ML model can be compared to groundtruth data (e.g., historical spread data) to determine one or more of the evaluation metrics of the present disclosure, as described herein. If the predictions of the ML model are determined to be inaccurate, another epoch of training can be executed, during which one or more parameters of the model are adjusted. For example, if a percentage of inaccurate predictions exceeds a threshold percentage (e.g., greater than 3%), training can continue. If a percentage of inaccurate predictions does not exceed the threshold percentage (e.g., less than or equal to 3%), training can be stopped.

While the techniques described in this specification have largely been described with respect to fire spread, the techniques are not limited to fire spread, as noted above. In general, the evaluation metrics of the present disclosure can be utilized to compare any two single-channel images with either binary values (thresholded) or continuous values (e.g., in the range [0,1]), especially in cases where the images contain data representing stochastic events, such as spatially spreading events. Other characteristics that can be predicted using the techniques described in this specification can include the following examples.

Population spread models can predict population growth and/or spread given the populations and their locations from previous time intervals, as well as data related to the environment (e.g., food supply, presence of predators, etc.). Each pixel can represent the likelihood of the population spreading to that pixel. The direction and scale of growth can be used to assist for city planning, among other benefits.

Biodiversity loss models can predict how a certain ecosystem/area might lose biodiversity over time.

Disease spread models can predict how a disease might spread to different regions based on prevalence and locations of prior spread as well as data related to the environments of the surrounding regions (sanitary condition, mask usage, etc.).

Various weather-related predictions can also be made. For example, hurricane models must accurately predict the direction of a hurricane to ensure safety measures can be taken where needed. Additionally, determining the scale of the impact can influence emergency responses. Hurricanes, like other natural phenomena, are stochastic in nature, which makes the evaluation metrics of this specification particularly relevant for this use case. In another example, tornado path prediction is similar to hurricane path prediction but with different input variables. For example, tornados might damage certain types of buildings more than hurricanes do, so using as input the quantity of such buildings can result in more accurate predictions.

Global climate models can predict the nature (temperature distribution, precipitation levels, etc.) of the climate in certain areas in future years. As with other natural processes, climate change is stochastic. The direction of climate change is important to allow regions to prepare for such climate changes if it is predicted in a nearby area.

Mesoscale level weather models can predict weather for intermediate scale areas, such as events that impact tens or hundreds of kilometers over hours or a small number of days.

Rock avalanche runout models can predict the location and scale of debris from avalanche runout. Due to the Butterfly effect, the process is stochastic since small changes in initial conditions (slope of mountains, amount of snow cover, etc.) can result in varying outcomes. Determining the direction of potential runouts can help with evacuation planning, while understanding the scale can help with building protection and insurance efforts. In addition, rainfall runoff forecasting is similar to avalanche runout.

Earthquake ground motion models can produce data that contain predictions relating to the magnitude of the ground shaking for a given region. Earthquake models can predict areas more likely to have large ground motion (potentially even large enough for an earthquake). These results can be used to determine trends in ground motion that can lead to larger earthquakes. While direction is not of primary importance for earthquake predictions, scale is of particular focus since identifying substantial ground motion levels in a certain area can suggest a larger earthquake in the future.

Computer malware spread models can augment conventional malware spread models. While conventional malware spread models focus on graph connections between computers to understand how viruses may spread, in some cases, malware spreads by proximity, such as Bluetooth, NFC, or USB. In such cases, the techniques described in this specification can be used to predict malware spread.

Information spread modeling across social networks is similar to malware spread models, and benefits from locality since information can spread more easily to people nearby. As with other use cases, the output of the model can be a map with relative likelihood of spread, the direction and scale of these results are important when recommending connections among individuals.

Traffic flow predictions are inherently stochastic since there is not a steady, predictable stream of cars coming in at all times. The predictions can reflect areas that will have a higher likelihood of worse traffic. The direction and scale of changes in traffic are essential to determining where to redirect traffic for policy makers.

Building energy models can predict how much each building in a city will use based on prior usage data and other factors such as weather (e.g., hot days result in more electricity usage). The model can produce a map with predictions on electricity usage per building as well as confidence intervals. Predictions can produce energy-related units (e.g., kilowatt hours) instead of probabilities.

This specification uses the term "configured" in connection with systems and computer program components. For a system of one or more computers to be configured to perform particular operations or actions means that the system has installed thereon software, firmware, hardware, or a combination thereof that, in operation, cause the system to perform the operations or actions. For one or more computer programs to be configured to perform particular operations or actions means that the one or more programs include instructions that, when executed by data processing apparatus, cause the apparatus to perform the operations or actions.

Implementations of the subject matter and the functional operations described in this specification can be realized in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs (i.e., one or more modules of computer program instructions) encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. The program instructions can be encoded on an artificially-generated propagated signal (e.g., a machine-generated electrical, optical, or electromagnetic signal) that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include special purpose logic circuitry (e.g., an FPGA (field programmable gate array) or an ASIC (application-specific integrated circuit)). The apparatus can optionally include, in addition to hardware, code that creates an execution environment for computer programs (e.g., code) that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data (e.g., one or more scripts stored in a markup language document) in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in some cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry (e.g., a FPGA, an ASIC), or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer can be embedded in another device (e.g., a mobile telephone, a personal digital assistant (PDA), a mobile audio or video player, a game console, a Global Positioning System (GPS) receiver), or a portable storage device (e.g., a universal serial bus (USB) flash drive) to name just a few.

Computer-readable media suitable for storing computer program instructions and data include all forms of non-volatile memory, media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks.

To provide for interaction with a user, implementations of the subject matter described in this specification can be provisioned on a computer having a display device (e.g., a CRT (cathode ray tube) or LCD (liquid crystal display) monitor) for displaying information to the user and a keyboard and a pointing device (e.g., a mouse, a trackball), by which the user can provide input to the computer. Other kinds of devices can be used to provide for interaction with a user as well; for example, feedback provided to the user can be any form of sensory feedback (e.g., visual feedback, auditory feedback, tactile feedback); and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device (e.g., a smartphone that is running a messaging application), and receiving responsive messages from the user in return.

Data processing apparatus for implementing machine learning models can also include, for example, special-purpose hardware accelerator units for processing common and compute-intensive parts of machine learning training or production (i.e., inference, workloads).

Machine learning models can be implemented and deployed using a machine learning framework (e.g., a TensorFlow framework, a Microsoft Cognitive Toolkit framework, an Apache Singa framework, an Apache MXNet framework).

Implementations of the subject matter described in this specification can be realized in a computing system that includes a back-end component (e.g., as a data server) a middleware component (e.g., an application server), and/or a front-end component (e.g., a client computer having a graphical user interface, a web browser, or an app through which a user can interact with implementations of the subject matter described in this specification, or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a user device (e.g., for purposes of displaying data to and receiving user input from a user interacting with the device), which acts as a client. Data generated at the user device (e.g., a result of the user interaction) can be received at the server from the device.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a claimed combination can in some cases be excised from the combination, and the claimed combination may be directed to a sub-combination or variation of a sub-combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more processors and comprising:

obtaining input features representative of a region of space;

processing an input comprising the input features through a machine learning (ML) model to generate a prediction describing predicted features of the region of space;

obtaining result features describing the region of space;

determining a value of at least one evaluation metric that relates the predicted features and the result features, that at least one evaluation metric comprising one of a distance score, a pyramiding density error, and min-max intersection over union (IOU) score, wherein determining the value of the at least one evaluation metric that relates the predicted features and the result features comprises:

determining a first value of the distance score that relates the predicted features and the result features;

determining a second value of the pyramiding density error that relates the predicted features and the result features;

determining a third value of the min-max IOU score that relates the predicted features and the result features; and comparing the first value, the second value, and the third value to a first threshold, a second threshold, and a third threshold, respectively; and training the ML model responsive to the at least one evaluation metric whose value satisfies a respective threshold.

2. The method of claim 1, wherein obtaining the input features representative of the region of space comprises:

obtaining image data of the region of space; and obtaining a set of properties of the region of space, wherein the set of properties comprise a set of data layers, each layer of the set of data layers comprises (i) an array of pixels representing a portion of the region of space and (ii) having data that is representative of the portion of the region.

3. The method of claim 2, wherein processing the input comprising the input features through the ML model to generate the prediction describing the predicted features of the region of space comprises:

for each layer of the set of data layers:

for each pixel in the array of pixels of the layer:

providing the pixel as input to the ML model to generate the prediction describing the predicted features of the region of space, wherein the prediction represents a likelihood that a spread occurs to the pixel in a subsequent training iteration.

4. The method of claim 3, wherein the likelihood that the spread occurs to the pixel comprises the likelihood that a natural disaster spread, a population spread, a disease spread, or a malware spread occurs to the pixel in the subsequent training iteration.

5. The method of claim 3, wherein obtaining the results features describing the region of space comprises obtaining observed features describing the region of space.

6. The method of claim 1, further comprising:

determining the predicted features are accurate in response to determining the first value satisfies the first threshold; or determining the predicted features are inaccurate in response to determining the second value satisfies the second threshold; or determining the predicted features are accurate in response to:

determining the first value does not satisfy the first threshold;

determining the second value does satisfy the second threshold; and determining the third value does satisfy the third threshold.

7. The method of claim 1, wherein determining the value of the pyramiding density error that relates the predicted features and the result features comprises:

computing a density difference between the predicted features and the result features by:

counting a first number of pixels in the predicted features that show spread;

counting a second number of pixels in the result features that show spread;

determining a first density of the first number of pixels;

determining a second density of the second number of pixels; and determining the density difference by subtracting the first density from the second density;

dividing each of the predicted features and the result features into one or more sub-quadrants; and recomputing the density difference if a size of the one or more sub-quadrants satisfies a threshold; or calculating the value of the pyramiding density error as the density difference between the predicted features and the result features.

8. The method of claim 1, wherein determining the value of the min-max IOU score that relates the predicted features and the result features comprises:

for each pixel in the predicted features:

comparing a value of the pixel of predicted features to a value of a pixel of the result features, wherein the comparison is performed between two pixels at the same location;

in response to the comparison:

adding the value of the pixel to a first array whose value is less; and adding the value of the pixel to a second array whose value is greater; and generating a third array by (i) summing the values of the first array and the second array and (ii) dividing the summed values by the values of the second array, wherein the min-max IOU score for each pixel is stored by the generated third array.

9. The method of claim 1, wherein training the ML model is performed over multiple epochs.

10. The method of claim 1, further comprising:

comparing the determined value of the at least one evaluation metric a threshold value;

determining the value of the at least one evaluation metric satisfies the threshold value; and in response, training the ML model responsive to the at least one evaluation metric that satisfies the threshold value.

11. A system comprising:

one or more computers and one or more storage devices storing instructions that are operable, when executed by the one or more computers, to cause the one or more computers to perform operations comprising:

obtaining input features representative of a region of space;

processing an input comprising the input features through a machine learning (ML) model to generate a prediction describing predicted features of the region of space;

obtaining result features describing the region of space;

determining a value of at least one evaluation metric that relates the predicted features and the result features, that at least one evaluation metric comprising one of a distance score, a pyramiding density error, and min-max intersection over union (IOU) score, wherein determining the value of the at least one evaluation metric that relates the predicted features and the result features comprises:

determining a first value of the distance score that relates the predicted features and the result features;

determining a second value of the pyramiding density error that relates the predicted features and the result features;

determining a third value of the min-max IOU score that relates the predicted features and the result features; and comparing the first value, the second value, and the third value to a first threshold, a second threshold, and a third threshold, respectively; and training the ML model responsive to the at least one evaluation metric whose value satisfies a respective threshold.

12. The system of claim 11, wherein obtaining the input features representative of the region of space comprises:

obtaining image data of the region of space; and obtaining a set of properties of the region of space, wherein the set of properties comprise a set of data layers, each layer of the set of data layers comprises (i) an array of pixels representing a portion of the region of space and (ii) having data that is representative of the portion of the region.

13. The system of claim 12, wherein processing the input comprising the input features through the ML model to generate the prediction describing the predicted features of the region of space comprises:

for each layer of the set of data layers:

for each pixel in the array of pixels of the layer:

providing the pixel as input to the ML model to generate the prediction describing the predicted features of the region of space, wherein the prediction represents a likelihood that a spread occurs to the pixel in a subsequent training iteration.

14. The system of claim 13, wherein the likelihood that the spread occurs to the pixel comprises the likelihood that a natural disaster spread, a population spread, a disease spread, or a malware spread occurs to the pixel in the subsequent training iteration.

15. The system of claim 13, wherein obtaining the results features describing the region of space comprises obtaining observed features describing the region of space.

16. The system of claim 11, further comprising:

determining the predicted features are accurate in response to determining the first value satisfies the first threshold; or determining the predicted features are inaccurate in response to determining the second value satisfies the second threshold; or determining the predicted features are accurate in response to:

determining the first value does not satisfy the first threshold;

determining the second value does satisfy the second threshold; and determining the third value does satisfy the third threshold.

17. The system of claim 11, wherein determining the value of the pyramiding density error that relates the predicted features and the result features comprises:

computing a density difference between the predicted features and the result features by:

counting a first number of pixels in the predicted features that show spread;

counting a second number of pixels in the result features that show spread;

determining a first density of the first number of pixels;

determining a second density of the second number of pixels; and determining the density difference by subtracting the first density from the second density;

dividing each of the predicted features and the result features into one or more sub-quadrants;

recomputing the density difference if a size of the one or more sub-quadrants satisfies a threshold; or calculating the value of the pyramiding density error as the density difference between the predicted features and the result features.

18. A non-transitory computer-readable medium storing software comprising instructions executable by one or more computers which, upon such execution, cause the one or more computers to perform operations comprising:

obtaining input features representative of a region of space;

processing an input comprising the input features through a machine learning (ML) model to generate a prediction describing predicted features of the region of space;

obtaining result features describing the region of space;

determining a value of at least one evaluation metric that relates the predicted features and the result features, that at least one evaluation metric comprising one of a distance score, a pyramiding density error, and min-max intersection over union (IOU) score, wherein determining the value of the at least one evaluation metric that relates the predicted features and the result features comprises:

determining a first value of the distance score that relates the predicted features and the result features;

determining a second value of the pyramiding density error that relates the predicted features and the result features;

determining a third value of the min-max IOU score that relates the predicted features and the result features; and comparing the first value, the second value, and the third value to a first threshold, a second threshold, and a third threshold, respectively; and training the ML model responsive to the at least one evaluation metric whose value satisfies a respective threshold.

* * * * *